July 19, 1927. 1,636,320
C. MONTERO
AEROPLANE
Filed Aug. 10, 1925  3 Sheets-Sheet 2
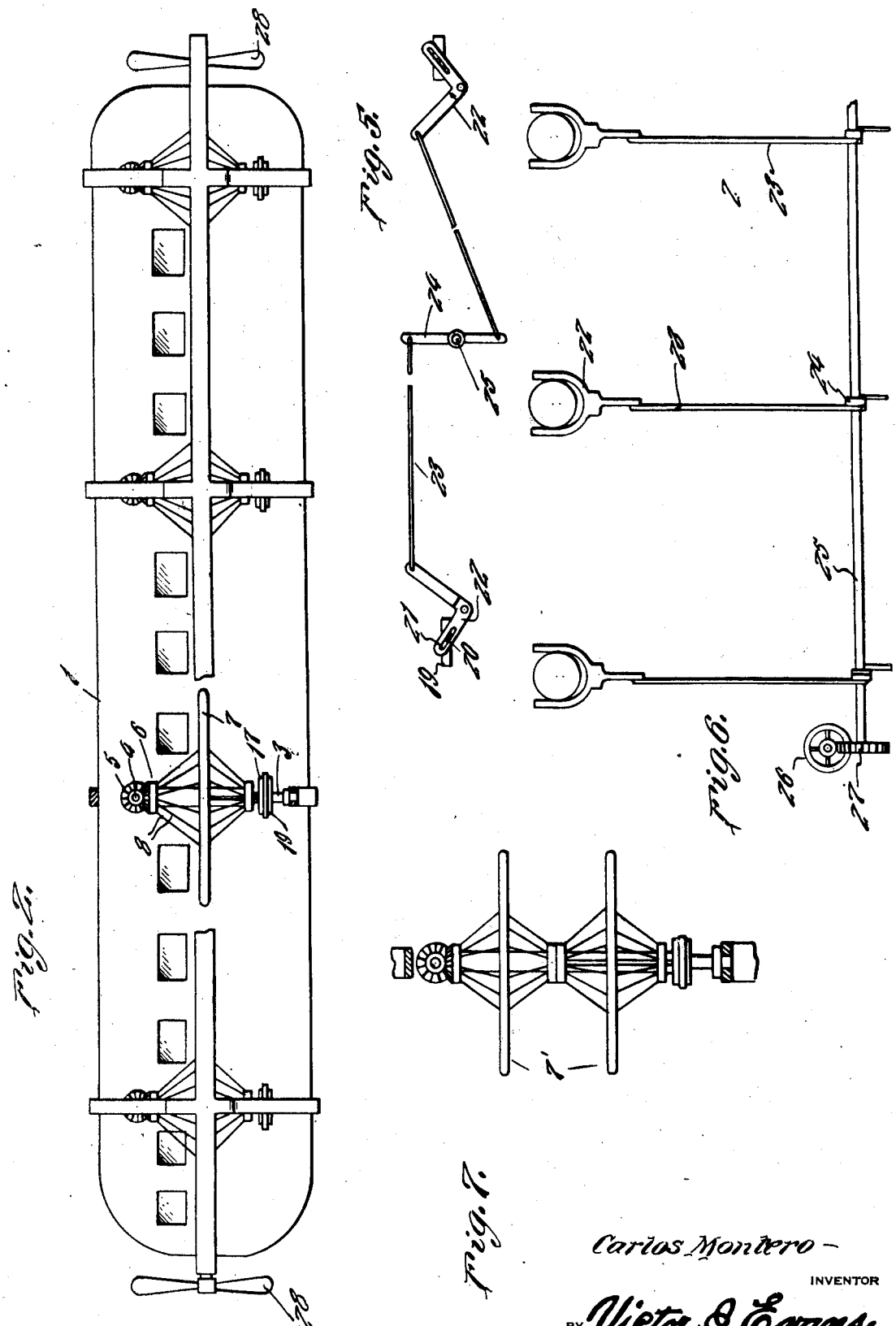
Carlos Montero
INVENTOR
BY Victor J. Evans
ATTORNEY July 19, 1927.
C. MONTERO
AEROPLANE
Filed Aug. 10, 1925
1,636,320
3 Sheets-Sheet 3
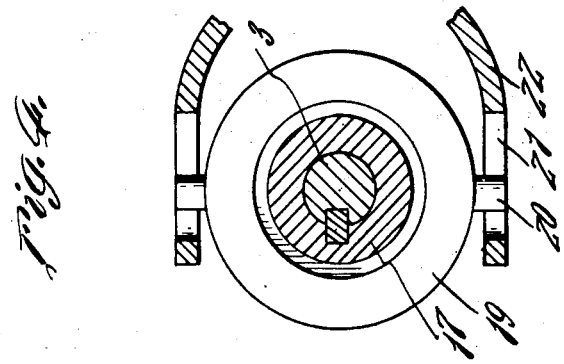
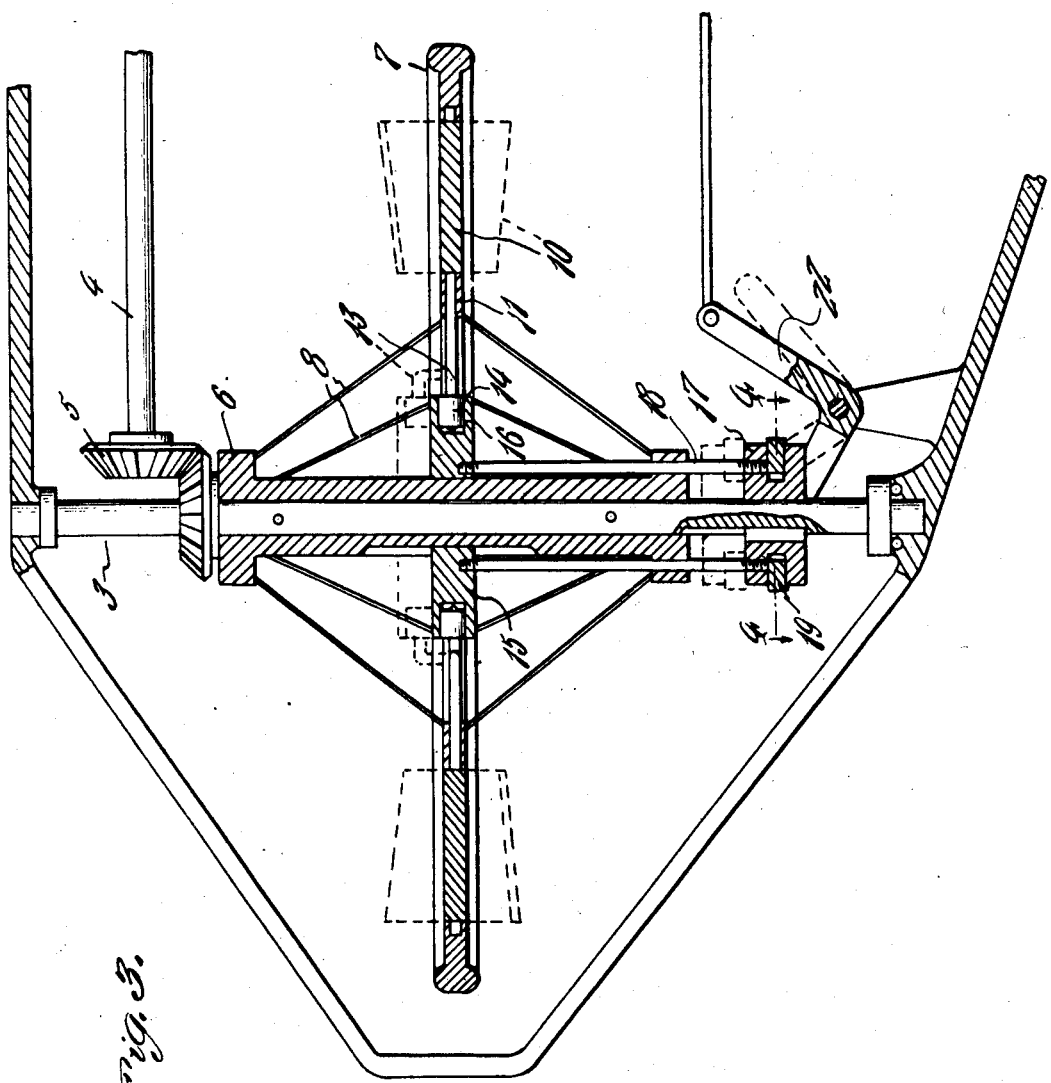
Carlos Montero
INVENTOR
BY Victor J. Evans
ATTORNEY Patented July 19, 1927.

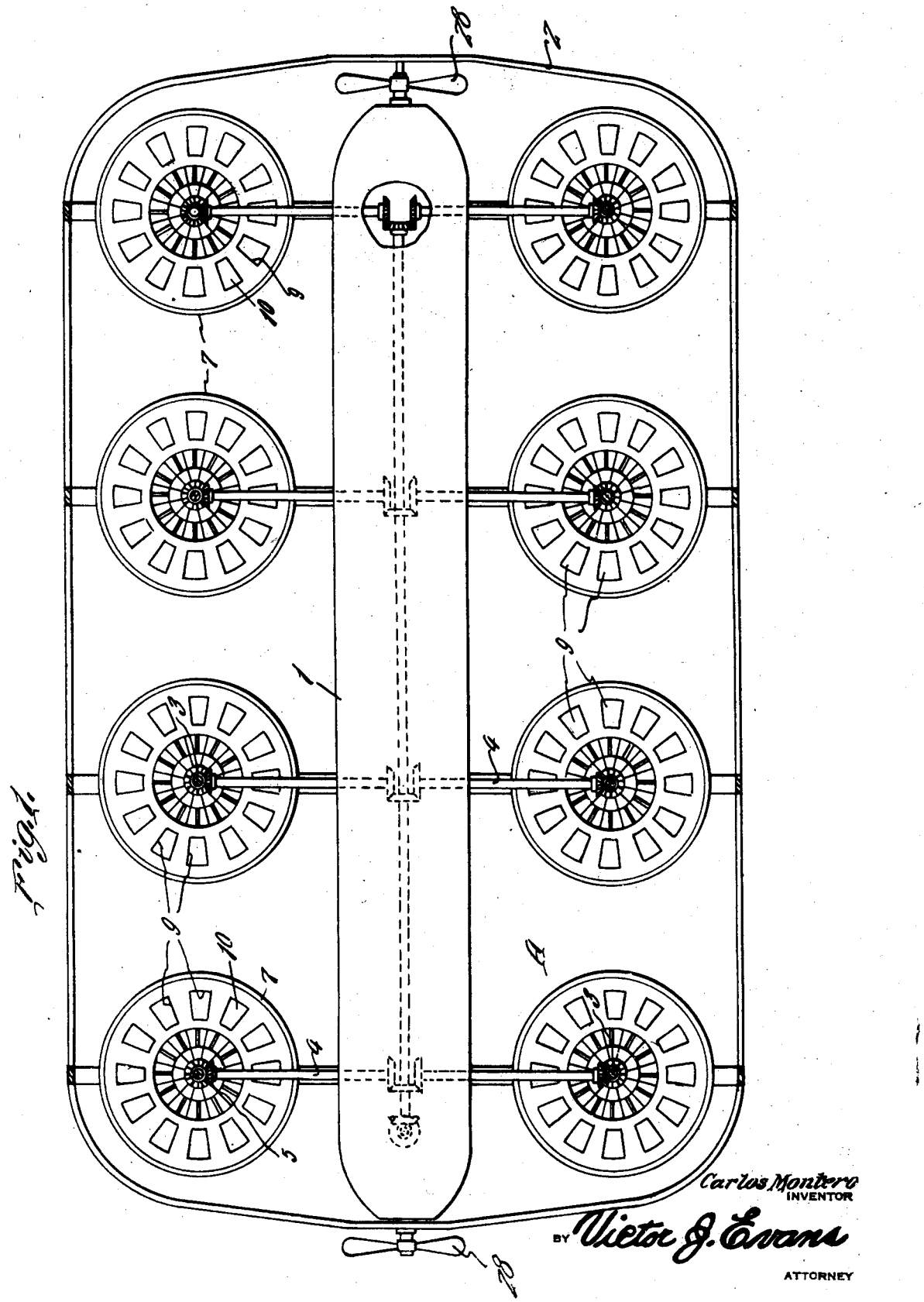

1,636,320

UNITED STATES PATENT OFFICE.

CARLOS MONTERO, OF HABANA, CUBA.

AEROPLANE.

Application filed August 10, 1925. Serial No. 49,467.

This invention relates to improvements in aircraft, the general object of the invention being to provide means whereby the craft can ascend and descend vertically, or practically so.

Another object of the invention is to provide a plurality of plane surfaces with means for rotating them, each surface having a plurality of vanes therein which are tilted at an angle when the device is to ascend or descend and which are placed in a horizontal position when the craft is moving horizontally, so that the surfaces will then act as planes or wings.

The invention also consists in certain other features of construction and in the combination and arrangement of the several parts, to be hereinafter fully described, illustrated in the accompanying drawings and pointed out in the appended claims.

In describing my invention in detail, reference will be had to the accompanying drawings wherein like characters denote like or corresponding parts throughout the several views, and in which:

Figure 1 is a plan view of an aircraft constructed in accordance with this invention.

Figure 2 is a side view thereof.

Figure 3 is an enlarged sectional view through one of the devices.

Figure 4 is a section on line 4—4 of Figure 3.

Figures 5 and 6 are diagrammatic views of the operating means for the vanes.

Figure 7 is a view showing a modification in which two vane carrying members are used instead of one.

In these views 1 indicates the body of the aircraft which may be of any desired type. A frame 2 extends around said body and this frame supports a plurality of members A. Each member comprises a vertically arranged shaft 3 journaled in the frame and driven from any suitable source of power through means of the shafts 4 and the gears 5. A sleeve 6 is fastened to the shaft 3 and said sleeve supports a plane 7 of circular or any other desired shape, braces 8 being provided for connecting the plane with the upper and lower portions of the sleeve. This plane is provided with a plurality of openings 9 in each of which is mounted a vane 10, carried by a shaft 11, journaled in the plane and having a crank inner end 13 which carries a roller 14. A hub 15 is slidably mounted on the sleeve and rotates therewith and forms the center of the plane 7. This hub is provided with an annular groove 16 which receives the rollers 14. A grooved collar 17 is keyed to the shaft 3 and is connected with the hub 15 by means of the rods 18. A ring 19 engages the groove in the collar and has its pintles 20 engaging slots 21 in one arm of the bell crank 22 which is pivoted to part of the frame 2. Thus by tilting the bell crank the collar 17 will be raised so as to force the hub 15 upwardly above the plane 7 and this movement of the hub will rock the shafts 11 and thus tilt the vanes 10 in the openings 9. When the vanes are so tilted and the members are being rotated, said members will cause the ship to ascend or descend, according to the direction of inclination of the vanes, but when the vanes are in horizontal position the members will act as ordinary plane or blades of the flying machine, and due to their rotary movements they will act somewhat on the order of a gyroscope to stabilize the craft.

The bell cranks 22 are connected by the links 23 with the arms 24 on a shaft 25, so that when the shaft is rotated by means of the hand wheel 26 and the connection 27 the vanes of all the members will be operated simultaneously.

The craft is provided with the usual propellers 28 for driving the ship horizontally.

Figure 7 shows each shaft 3 carrying a pair of members 7' and it will, of course, be understood that any number of these members can be placed on each shaft.

With this invention it is not necessary for a flying machine to have a landing or ascending field of great length, as it will arise almost vertically when the vanes in the members are tilted at the proper angle. When the craft is sailing along the members with the vanes closed will act to steady the ship and increase the supporting surface of the craft.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described the invention, what is claimed as new, is:—

1. In a device of the character described, a rotatably mounted sleeve, a plane member normally disposed in a horizontal position intermediate the ends of said sleeve, a hub slidably mounted upon the sleeve and secured thereto, brace members connecting the plane with the sleeve, an annular groove formed in the perimeter of the hub, said plane being formed with a plurality of circumferentially arranged openings, vanes movable in said openings, means forming connection between the hub and vanes for actuating said vanes upon movement of the hub relative to the sleeve, and manually operated means for imparting movement to said hub.

2. In an air craft, a rotatably mounted sleeve, a hub slidably mounted upon the sleeve having a circumferential groove in its perimeter, a plane normally disposed in a horizontal position and surrounding the sleeve, brace members connecting the ends of the sleeve with the plane, said plane having a plurality of circumferential openings, vanes movable in said openings, shafts extending inwardly from the vanes and formed with cranks at their inner ends, rollers upon said cranks and disposed within the groove of the hub, a collar movable relative to one end of the sleeve and having connection with the hub, and manually operated means having connection with the collar whereby to impart movement to the hub to adjust the positions of the vanes relative to the plane.

In testimony whereof I affix my signature.

CARLOS MONTERO.